United States Patent
Prasad

(10) Patent No.: US 10,904,619 B2
(45) Date of Patent: Jan. 26, 2021

(54) METHODS AND APPARATUS FOR DISTRIBUTING USER-GENERATED ADVERTISEMENTS IN A VIDEO CONTENT DISTRIBUTION NETWORK

(71) Applicant: Sling Media PVT. LTD., Bangalore (IN)

(72) Inventor: Neeraj Prasad, Patna (IN)

(73) Assignee: Sling Media PVT. LTD., Bangalore (IN)

( * ) Notice: Subject to any disclaimer, the term of this patent is extended or adjusted under 35 U.S.C. 154(b) by 279 days.

(21) Appl. No.: 15/909,436

(22) Filed: Mar. 1, 2018

(65) Prior Publication Data

US 2018/0192109 A1 Jul. 5, 2018

Related U.S. Application Data

(63) Continuation of application No. 15/200,242, filed on Jul. 1, 2016, now Pat. No. 9,948,969, which is a
(Continued)

(51) Int. Cl.
*H04N 21/2668* (2011.01)
*H04N 21/258* (2011.01)
(Continued)

(52) U.S. Cl.
CPC ..... *H04N 21/458* (2013.01); *H04N 21/25841* (2013.01); *H04N 21/25883* (2013.01); *H04N 21/25891* (2013.01); *H04N 21/2668* (2013.01); *H04N 21/26603* (2013.01); *H04N 21/2743* (2013.01); *H04N 21/4227* (2013.01);
(Continued)

(58) Field of Classification Search
None
See application file for complete search history.

(56) References Cited

U.S. PATENT DOCUMENTS

| 7,188,085 B2 | 3/2007 | Pelletier |
| 8,775,250 B2 * | 7/2014 | Murphy ................ G06Q 30/02 705/14.41 |

(Continued)

FOREIGN PATENT DOCUMENTS

| WO | 2007103655 A2 | 9/2007 |
| WO | 2009085471 A2 | 7/2009 |

OTHER PUBLICATIONS

U.S. Appl. No. 12/964,975, filed Dec. 10, 2010 Non-Final Rejection dated Feb. 11, 2014, all pages.
(Continued)

*Primary Examiner* — Ricky Chin

(57) ABSTRACT

User-generated advertisements are distributed to client devices in a video content distribution network. For example, a client device may receive a user-generated advertisement, which is associated with one or more categories. The user-generated advertisement is associated with a channel based on a category of the advertisement. One or more channels of user-generated advertising, corresponding to the one or more categories, may be provided to a client device. Optionally, user-generated advertisements may be associated with a geographical identifier and distributed to client devices in a geographical region corresponding with the geographical identifier.

20 Claims, 6 Drawing Sheets

Related U.S. Application Data continuation of application No. 12/964,975, filed on Dec. 10, 2010, now Pat. No. 9,402,109.

(51) Int. Cl.
| | |
|---|---|
| *H04N 21/266* | (2011.01) |
| *H04N 21/84* | (2011.01) |
| *H04N 21/458* | (2011.01) |
| *H04N 21/2743* | (2011.01) |
| *H04N 21/4227* | (2011.01) |
| *H04N 21/61* | (2011.01) |
| *H04N 21/81* | (2011.01) |
| *H04N 21/45* | (2011.01) |
| *H04N 21/4788* | (2011.01) |

(52) U.S. Cl.
CPC ..... *H04N 21/4524* (2013.01); *H04N 21/4532* (2013.01); *H04N 21/4788* (2013.01); *H04N 21/6125* (2013.01); *H04N 21/812* (2013.01); *H04N 21/84* (2013.01)

(56) References Cited

U.S. PATENT DOCUMENTS

| | | | |
|---|---|---|---|
| 9,148,612 | B2 | 9/2015 | Holley |
| 9,402,109 | B2 | 7/2016 | Prasad |
| 2002/0166120 | A1 | 11/2002 | Boylan, III |
| 2005/0165638 | A1 | 7/2005 | Piller |
| 2006/0277105 | A1* | 12/2006 | Harris .................. G06Q 30/02 705/14.66 |
| 2007/0168543 | A1 | 7/2007 | Krikorian et al. |
| 2007/0294722 | A1 | 12/2007 | Kang et al. |
| 2008/0059989 | A1 | 3/2008 | O'Connor et al. |
| 2008/0086368 | A1* | 4/2008 | Bauman ................ G06Q 30/02 705/7.34 |
| 2009/0019485 | A1* | 1/2009 | Ellis ................. H04N 5/44543 725/40 |
| 2009/0172724 | A1 | 7/2009 | Ergen et al. |
| 2009/0186700 | A1* | 7/2009 | Konkle ................ A63J 25/00 463/42 |
| 2009/0217329 | A1* | 8/2009 | Riedl ................ H04N 7/17318 725/93 |
| 2009/0254931 | A1* | 10/2009 | Pizzurro ............ H04N 21/4667 725/5 |
| 2009/0292608 | A1* | 11/2009 | Polachek .............. G06Q 30/02 705/14.44 |
| 2010/0036970 | A1 | 2/2010 | Ariff |
| 2010/0058383 | A1 | 3/2010 | Chang et al. |
| 2010/0122287 | A1 | 5/2010 | Beyabani et al. |
| 2010/0131350 | A1 | 5/2010 | Yeh et al. |
| 2010/0153991 | A1 | 6/2010 | Pandey |
| 2010/0228776 | A1* | 9/2010 | Melkote ................ G06F 3/0481 707/770 |
| 2010/0319040 | A1 | 12/2010 | Diaz Perez |
| 2011/0125594 | A1* | 5/2011 | Brown .................. G06Q 30/02 705/14.73 |
| 2011/0145070 | A1* | 6/2011 | Wolinsky ........... G06Q 30/0241 705/14.61 |
| 2011/0202270 | A1 | 8/2011 | Sharma et al. |
| 2011/0231265 | A1* | 9/2011 | Brown .................. G06Q 30/02 705/14.73 |
| 2011/0288917 | A1* | 11/2011 | Wanek .................. G06Q 30/00 705/14.5 |
| 2012/0010999 | A1 | 1/2012 | Feuling |
| 2012/0047532 | A1 | 2/2012 | McCarthy |
| 2012/0072276 | A1* | 3/2012 | Stivers ............... G06Q 30/0215 705/14.17 |
| 2012/0221419 | A1* | 8/2012 | Woxblom .............. G06Q 30/02 705/14.73 |
| 2012/0265633 | A1* | 10/2012 | Wohlstadter ........... G06Q 40/02 705/26.3 |
| 2013/0014160 | A1 | 1/2013 | Harris |
| 2013/0024889 | A1* | 1/2013 | Yan ..................... H04L 12/1881 725/32 |
| 2013/0211907 | A1* | 8/2013 | Morgenstern ...... G06Q 30/0245 705/14.44 |
| 2014/0289037 | A1* | 9/2014 | Wojcicki ................ G06Q 30/02 705/14.45 |

OTHER PUBLICATIONS

U.S. Appl. No. 12/964,975, filed Dec. 10, 2010 Final Rejection dated May 29, 2014, all pages.
U.S. Appl. No. 12/964,975, filed Dec. 10, 2010 Non-Final Rejection dated Oct. 17, 2014, all pages.
U.S. Appl. No. 12/964,975, filed Dec. 10, 2010 Non-Final Rejection dated May 21, 2015, all pages.
U.S. Appl. No. 12/964,975, filed Dec. 10, 2010 Final Rejection dated Nov. 20, 2015, all pages.
U.S. Appl. No. 12/964,975, filed Dec. 10, 2010 Notice of Allowance dated Mar. 22, 2016, all pages.
U.S. Appl. No. 15/200,242, filed Jul. 1, 2016 Non-Final Rejection dated Apr. 19, 2017, all pages.
U.S. Appl. No. 15/200,242, filed Jul. 1, 2016 Final Rejection dated Oct. 4, 2017, all pages.
U.S. Appl. No. 15/200,242, filed Jul. 1, 2016 Notice of Allowance dated Mar. 12, 2018, all pages.

* cited by examiner though a user-generated advertisement.

METHODS AND APPARATUS FOR DISTRIBUTING USER-GENERATED ADVERTISEMENTS IN A VIDEO CONTENT DISTRIBUTION NETWORK

CROSS-REFERENCE TO RELATED APPLICATIONS

This is a continuation of U.S. patent application Ser. No. 15/200,242, entitled "METHODS AND APPARATUS FOR DISTRIBUTING USER-GENERATED ADVERTISEMENTS IN A VIDEO CONTENT DISTRIBUTION NETWORK," filed on Jul. 1, 2016, which is a continuation of U.S. patent application Ser. No. 12/964,975, entitled "METHODS AND APPARATUS FOR DISTRIBUTING USER-GENERATED ADVERTISEMENTS IN A VIDEO CONTENT DISTRIBUTION NETWORK," filed on Dec. 10, 2010. The contents of the above applications are hereby incorporated by reference in their entireties for all purposes.

BACKGROUND

People and businesses often prefer to sell and buy locally. This preference may exist due to any of a variety of reasons, for example, security and trust concerns, perishability of certain goods, a "buy local" socioeconomic philosophy, or higher marketing, transactional and shipping costs associated with selling goods to buyers at distant locations. Additionally, selling and purchasing locally may often make sense where a person or business only has a single item or a limited number of items to sell, or where a business has a physical inventory or a business presence in a particular geographical area. Both individuals and businesses have traditionally taken advantage of classified advertisements as an effective form of local marketing.

For many years, classified advertisements (also known as "classified ads" or "classifieds") have been distributed in print form—often as tersely worded captions in back pages of newspapers and magazines or in publications wholly dedicated to this advertising genre. Advertisers are often charged to place print classified ads based on the length of the ad and/or the length of time the ad will run. Advertisers may also be charged extra for prominent ad placement, to include a photograph, for color, or for other features. In any case, classified ads are often categorized for browsing ease.

With the rise of the internet, online classified advertising has thrived. Classified ads listings may be found among the web pages of local news outlets, on general-purpose classified advertisement web sites such as CRAIGSLIST.ORG, or on sites focused on one particular class of goods or services, such as CARS.COM. Through online outlets such as these, users can advertise their items to their local market at a low cost or in some instances for free. In some cases, users may use online classified advertising to advertise both locally and to a much larger geographical area at little or no extra cost. Online classified advertisements are often categorized much as is done in print classifieds. Additionally, the ads are also often searchable.

In contrast to print and online classified advertisements, television advertising has in many instances only been attractive to businesses whose strategy involves the mass marketing of a given product, service, or brand to a large television audience. The high costs of television advertising airtime, the limited duration of television advertisements, and the time, cost and effort involved in producing quality video advertisements have all traditionally limited the value and feasibility of using television as a means to distribute some of the types of advertisements that typically appear in classified advertisement publications and web sites.

BRIEF DESCRIPTION OF THE DRAWINGS

The same number represents the same element or same type of element in all drawings.

DETAILED DESCRIPTION

Figure 1:
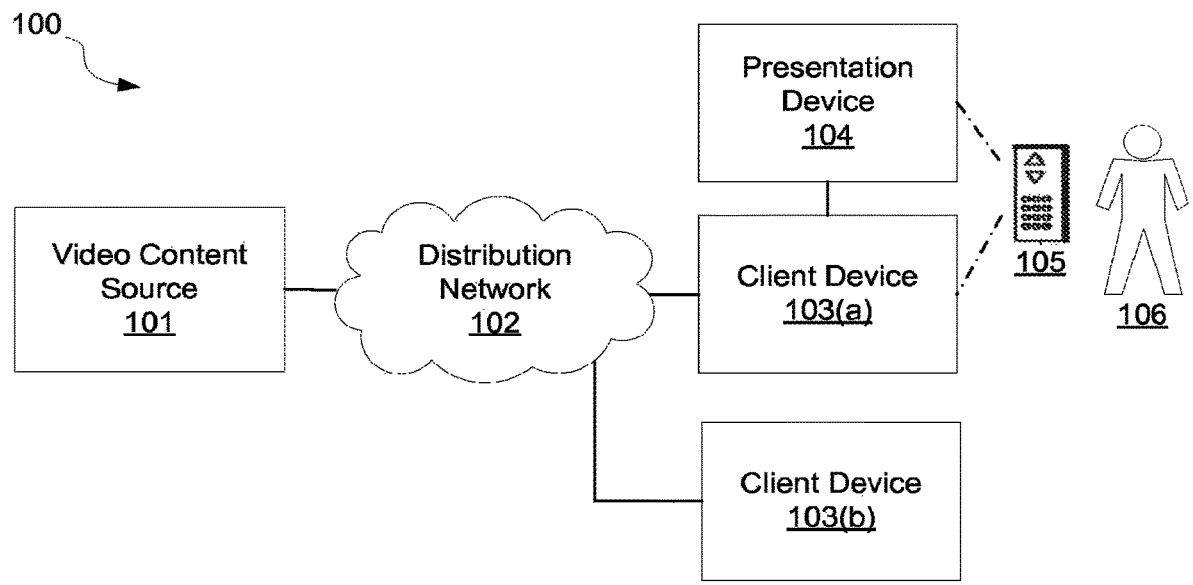
FIG. 1 illustrates an embodiment of a video content distribution environment.

The various embodiments described herein generally provide methods, apparatuses, and systems for distributing user-generated advertisements in a video content distribution network. User-generated advertisements may include textual, visual (e.g., photographs), audio and/or video content. One or more categories may be provided for user-generated advertisements.

In one embodiment, a video content source distributes video content to multiple client devices in a video content distribution network. Multiple channels of user-generated advertising are also distributed to the client devices. Various uploads of user-generated advertisements are received. Each user-generated advertisement is associated with at least one advertising category and associated with one or more channels according to the advertising categories. The user-generated advertisements are then transmitted, on the associated channels, to at least one of the client devices.

In at least one embodiment, some of the user-generated advertising channels are associated with a geographical region where one or more of the client devices resides. Each user-generated advertisement that is uploaded, in addition to being associated with at least one advertising category, is associated with a geographical identifier. The user-generated advertisement is transmitted to the one or more client devices that reside in the geographical region, which are associated with the geographical identifier. The user-generated advertisement is associated with a selected channel based on the at least one advertising category and the geographical identifier.

Other embodiments described herein comprise an entertainment device. The entertainment device may be a client device in a video content distribution network. The entertainment device has a receiving interface that receives video programming content. The receiving interface also receives a plurality of user-generated advertisements, which may correspond to the geographical region of the entertainment device. Each of the user-generated advertisements pertains to at least one category. The entertainment device also includes a processor, coupled to the receiving interface, which identifies multiple channels of the video programming content, and one or more channels of the user-generated advertisements. Each channel corresponds to a category, and one or more of the channels may also correspond to the geographical region of the entertainment device. A user input interface of the entertainment device receives a user selection of a channel. An output interface outputs the selected channel for display on a presentation device that is connected to the entertainment device.

In another embodiment, a content source transmits, to a client device, multiple channels of video programming content and a first set of user-generated advertisements that correspond geographically to the geographical region where the entertainment device is located. In some implementations, the user-generated advertisements are displayed at the entertainment device in at least one channel of user-generated advertisements. The entertainment device transmits at least one of the channels of video programming content from the entertainment device to a remote device that is geographically separate from the entertainment device. A second set of user-generated advertisements, which correspond geographically to the geographical region where the remote device is located, are transmitted to the remote device. In some implementations, the user-generated advertisements are displayed in at least one channel of user-generated advertisements thereon. In various embodiments, the second set of user-generated advertisements may be transmitted to the remote device directly from any of a video content source, a user-generated advertisement server, or the entertainment device.

FIG. 1 illustrates an example of a content distribution environment 100. Elements of the content distribution environment 100 are configured to present one or more video streams—which may include streams of user-generated advertisements—to a user 106. The content distribution environment 100 includes a video content source 101, a distribution network 102, a client device 103(a), a presentation device 104, and a second client device 103(b). A remote control 105 is also depicted, by which the user 106 may provide control commands to the client device 103(a) and/or the presentation device 104. Content distribution environment 100 may include other elements or components that are not illustrated for the sake of brevity.

The video content source 101 comprises any source or sources of television or other video signals. In at least one embodiment, the video content source 101 provides a television signal to the client device 103(a) over a distribution network 102, which is discussed below. The video content source 101 may be a television station that generates and provides the content, or may be a television service—e.g., a satellite television provider, cable television provider, fiber optic television provider, internet television provider, or other video content distributor—that provides retransmission of television signals.

The distribution network 102 may comprise any type of network utilized between the video content source 101 and the client device 103(a) to distribute television or other video signals. Video signals that are distributed across the distribution network 102 may comprise analog or digital signals. The signals may comprise video data, audio data and/or textual data (for example, closed captioning or program guide data). The signals may also comprise metadata that provides supplementary information to the video data (such as program guide data), facilitates processing the signals, and/or provides additional interactivity with the content. Examples of video formats include moving pictures expert group (MPEG), Flash, Windows Media, and other digital or analog formats. Some examples of distribution networks include television distribution networks (e.g., over-the-air, satellite, cable, and fiber-optic television networks), wireless communication networks, public switched telephone networks (PTSN), local area networks (LAN), wide area networks (WAN), and the internet, any of which would comprise a distribution network 102 when configured to provide a medium for distribution of video signals from a video content source 101 to client device 103(a). The distribution network 102 may utilize any desired combination of wired (e.g., cable and fiber) and/or wireless (e.g., cellular, satellite, microwave, and radio frequency) communication mediums and any desired network topology (or topologies when multiple mediums are utilized).

The client device 103(a) may be any device that is configured to receive video content from the distribution network 102. In some configurations, the client device is a set top box or other entertainment device which is configured to receive, demodulate, and/or decode digital or analog signals from the video content source 101 for presentation on the presentation device 104. Client device 103(a) may optionally include DVR (digital video recorder) hardware and/or software that captures and records video content received from the distribution network 102 or from other attached devices (not shown). Recorded video content is stored by the DVR onto a non-volatile storage medium that is internal (e.g., an integrated hard disk or solid-state drive) or external (e.g., an external hard drive, or storage on a remote server) to the client device 103(a). The client device 103(a) may also include conditional access hardware and/or software which control access to all or a portion of the available content 106. The client device 103(a) may operate in conjunction with a remote control 105, which allows a user 106 to provide remote input to the client device 103(a), the presentation device 104, and/or other devices not depicted. In some embodiments, client device 103(a) may be comprised of the same elements as entertainment device 103(c) depicted in FIG. 4, which will be described in more detail below.

The client device 103(a) is connected, through a wired or wireless connection, to presentation device 104 and outputs audio and/or video content to the presentation device 104. In some embodiments, the client device 103(a) and the presentation device 104 may be integrated into a single apparatus that is configured to receive, process, and present content from the video content source 101 (e.g., television, computer, tablet PC, portable handheld electronic device, or other client device that includes a display). In some embodiments, received video content may be demodulated and/or decoded at the client device 103(a) before being output to the presentation device 104. In other embodiments the video content may be provided from the client device 103(a) to the presentation device 104 in a format that requires additional demodulation or decoding at the presentation device 104. Examples of presentation devices that are compatible with embodiments of the present invention include television sets, display monitors, projectors, computer screens, portable electronic devices, and other display devices.

In various embodiments, the client device 103(a) may communicate with the distribution network 102 through a wired or wireless connection. The client device may, in some embodiments, be coupled to one or more connectivity devices (not shown) such as an antenna, router, switch, modem and/or other apparatus that is configured to interface between the client device 103(a) and the distribution network 102. Such connectivity devices may be either integrated into the client device 103(a) or external thereto.

A second client device 103(b) is shown in FIG. 1. In some embodiments, second client device 103(b) may be configured in the same manner as the first client device 103(a), as described herein. In other embodiments, second client device 103(b) may have a different configuration than client device 103(a) but still be configured to receive content from video content source 101 through the distribution network 102 and provide at least a portion of the received content to a second presentation device (not shown) for display. In some embodiments, the second client device 103(b) is located in a geographical region that is identifiably different than the geographical region in which the first client device 103(a) is located. The two client devices may receive different programming and/or advertising content, including user-generated advertising content, from the video content source 101 based on the geographical region in which they are located. The geographical region of a client device may be specified by one or more geographical identifiers such as postal codes (e.g., zip codes), telephonic area codes, city name, county, state, country, and the like.

The video content source 101 may distribute multiple different streams of audiovisual content, commonly referred to as "channels," to client devices. Audiovisual content may be video, audio, text, metadata, visual content, or any combination thereof. Client devices typically distinguish between channels based on alphanumeric "channel identifiers" that serve to identify a particular channel. In legacy broadcast television systems, a television channel, with its associated channel identifier, corresponded to a discrete frequency band, and a video stream comprising the channel was broadcast to end users within that frequency band. In such systems, the video stream could be viewed by tuning a television receiver to the frequency band corresponding to the channel. In modern television systems, the word "channel" is still widely used to describe different audiovisual streams in a video content distribution system, but there is no longer necessarily a one-to-one ratio between channels and frequency bands. For example, there are well-known mechanisms for transmitting a large number of streams of compressed, digitized video data across cable, fiber, the internet, or through the airwaves on a single frequency band or across a limited range of frequencies. This may involve multiplexing the different video channels at a transmission source or head-end and then demultiplexing the channels at a receiver, or it may involve packetizing video data and sending the packets down a transmission pathway for reassembly into different video streams at the receiver. In some implementations, "virtual channels" may be generated at a client device, have a corresponding channel identifier, and provide a view of content thereon. In sum, the word "channel," as it is used in this application, refers not necessarily to a discrete frequency band but to an audiovisual presentation stream that has a corresponding channel identifier at a client device, regardless of how the stream is transmitted, received, or generated. In some embodiments, a channel may comprise a video stream.

Channels of audiovisual content may be either "linear" or "nonlinear." A linear channel is one that provides a view of broadcast and/or synchronous video content. One example of a linear channel would be a channel providing a view of broadcast video content received from a conventional television network. In contrast, a nonlinear channel provides a view of non-broadcast content. As examples, a nonlinear channel could provide a view of guide information, an interactive television application, a display of stored photographs, a locally-stored video-on-demand, other stored video content, or other any other presentation of visual and/or audio data. Thus, in some embodiments, a nonlinear channel may be a virtual channel. A nonlinear channel could also be one that provides a view of content that is received asynchronously. As an example, content for display in a nonlinear channel could be downloaded to a client device at a bit-rate that is faster than a presentation rate, stored in a memory buffer, and viewed asynchronously; whereas in a linear channel, video information may be displayed or, optionally, recorded synchronously at the same rate and time it is received. In some embodiments, nonlinear channels and linear channels are both given channel identifiers that allow them to be selected by a user in substantially the same way. As an example, channel identifier "998" could correspond to a local news station, a linear channel, whereas channel identifier "999" could correspond to a nonlinear channel that provides an audiovisual presentation of stored content, an interactive TV application, or "on demand" content received asynchronously. The distribution of user-generated advertisement via channels, as taught in this application, can be accomplished in some embodiments using linear channels, and in other embodiments using nonlinear channels, as discussed in more detail herein.

The video content source 101 distributes multiple channels of video programming content to client devices 103(a) and 103(b) through the distribution network 102. In some embodiments, the video content source 101 also transmits one or more channels of user-generated advertising content. Each channel of user-generated advertising content may correspond to one or more categories of advertising data. For example, there may be one channel for furniture and a second channel for automobiles.

In some embodiments, some channels of user-generated advertisements are associated with a particular geographical region corresponding to at least one client device. For example, client device 103(a) could be located in a first region and receive a first set of user-generated advertisement channels, and client device 103(b) could be located in a second geographical region and receive a second set of user-generated advertisement channels that are specific to the second geographical region. In at least one embodiment, the user-generated advertising channels in each system could be given the same channel identifiers at each client device but provide a view of different user-generated advertisements, which are particular to the geographical region. For example, at client device 103(a), a channel identifier of "1000" could correspond to a video stream of user-generated advertisements categorized as "furniture" that pertain to the geographical region where client device 103(a) is located. Continuing this example, at client device 103(b), channel identifier "1000" could also correspond to a "furniture" category of user-generated advertisements, but the advertisements presented thereon would be particular to the geographical region where client device 103(b) is located. Alternatively, user-generated advertising channels for different regions could be assigned different channel identifiers.

Figure 2:
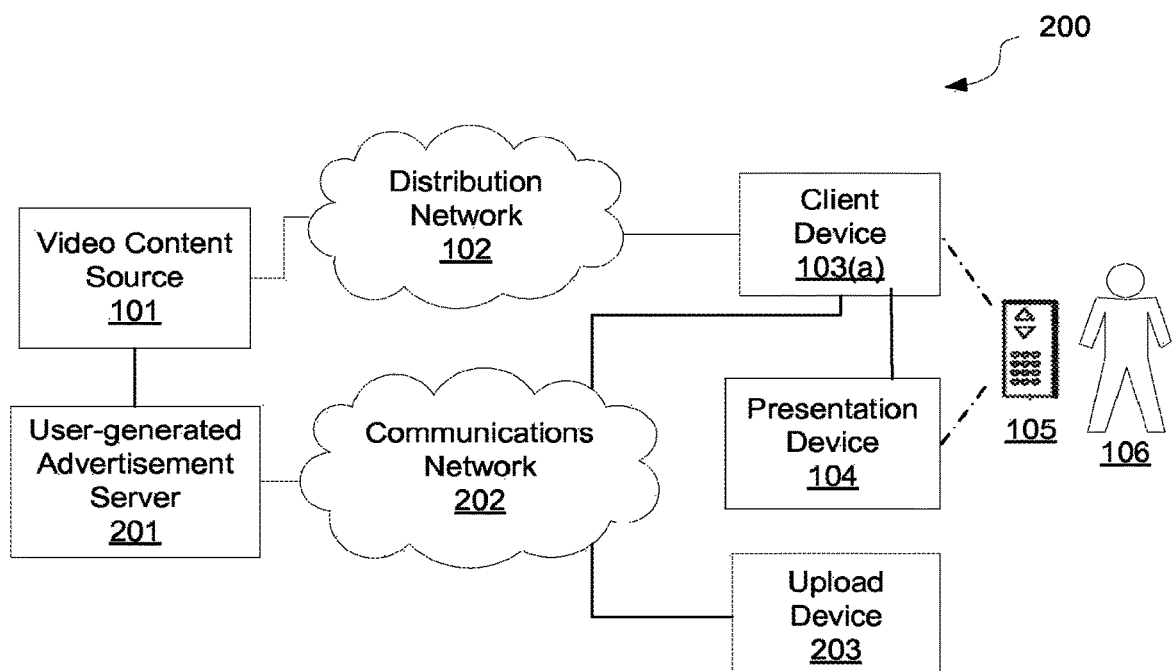
FIG. 2 illustrates an embodiment of a video content distribution environment that includes a communications network and a user-generated advertisement server.

A second content distribution environment 200 is depicted in FIG. 2. The content distribution environment 200 comprises a video content source 101, distribution network 102, client device 103(a), presentation device 104, remote control 105, and user 106—all of which may have similar attributes or configurations as the corresponding numbered elements discussed above with respect to FIG. 1. Additional elements not shown, such as a second client device 103(b) depicted in FIG. 1, may also be included in the content distribution environment 200 of FIG. 2, but are not depicted therein for the sake of brevity. In addition to having elements that are similar to those in content distribution environment 100, embodiments of content distribution environment 200 include a user-generated advertisement server 201, a communications network 202, and an upload device 203.

As described above, the video content source 101 depicted in FIG. 2 is configured to transmit both programming content and user-generated advertising content to the client device 103(*a*). In some embodiments, the content source 101 transmits multiple channels of programming content and multiple channels of user-generated advertising to the client device 103(*a*). In some embodiments, each user-generated advertising channel is associated with one of a plurality of user-generated advertising categories. Categories may correspond to one or more unique user-generated advertisement categories, for example, help wanted (i.e., job postings), automobiles, real estate, furniture, personals, and the like. In at least one embodiment, one or more user-generated advertising channels are specific to the geographical region where the client device 103(*a*) is located. In such embodiments, client devices in a region may be identifiable based on one or more geographical identifiers corresponding to the geographical region.

In some embodiments, the communications network 202 comprises a data communications network, such as the internet. In other embodiments, communications network 202 may be implemented through a public switched telephone network (PSTN), LAN, WAN, or other wired (including fiber, cable, DSL, ISDN, T1, and the like) or wireless (including microwave, radio frequency, Wi-Fi, WiMax, cellular, and the like) network or combination thereof. In the video content distribution environment 200, client device 103(*a*), upload device 203 and user-generated advertisement server 201 are each connected to the communications network 202. In some embodiments, communications network 202 and distribution network 102 may be the same network.

As an example of one embodiment that includes communications network 202, many client devices in modern video content distribution networks have a "back channel" through which client devices can send and receive communications regarding purchases, pay-per-view information, billing, diagnostics, or other information with one or more remote servers, and in at least one embodiment, with the video content source 101. This back channel may be implemented through the PSTN, internet, or other network, or, in some embodiments, back channel communications may be communicated across the communications network 202. In other embodiments, the client device 103(*a*) may include a connection to a back channel that is separate from a connection to the communications network 202. In still other embodiments, no traditional "back channel" exists for the client device 103(*a*).

The user-generated advertisement server 201, which is connected to the video content source 101 and the communications network 202, is configured to receive user-generated advertisements from an upload device 203 that is connected to the communications network 202. In at least one embodiment, the client device 103(*a*) and the upload device 203 would be integrated into a single apparatus, with a single connection to communications network 202. In such an embodiment, a user-generated advertisement is uploaded from the client device 103(*a*) (which is also the upload device 203) to the user-generated advertisement server 201. This may be facilitated by the client device 103(*a*) having an upload graphical user interface which would facilitate a user composing and/or uploading the advertisement. In other embodiments, the upload device 203 is a distinct device from the client device 103(*a*). An upload device 203 could be a computer, a portable mobile device such as a smart phone, tablet PC, or handheld computing device, or other consumer electronics device. Such a device may present a graphical user interface that permits a user to compose a user-generated advertisement and upload to the user-generated advertisement server 201. In some embodiments, the graphical user interface may be transmitted to the upload device 203 from the user-generated advertisement server 201, for example, as a web page or web application, software as a service, or other distributed application.

In some embodiments, a user may upload text and/or digital photograph files in order to create a user-generated advertisement. In other embodiments, user-generated advertisements may include other types of media, such as audio and video. In some embodiments, metadata may be provided with user-generated advertisements. The metadata can be XML, text, or other metadata that is transmitted in conjunction with a video stream but that is not visible to an end user. Metadata may be useful to provide for optional searching, sorting, filtering, and interactivity of user-generated advertisements. For example, the metadata may indicate the category of an advertisement, the geographical region to which it is targeted (for example, the metadata may comprise a geographical indicator such as a zip code), dates corresponding to the advertisements, keywords, a searchable text version of the ad, and the like.

In at least one embodiment, an uploading user may optionally embed interactive content into user-generated advertisements, which permits for a communication (e.g., telephone call or electronic message) to be initiated from an individual who views and is interested in the advertisement to an entity that is the source of the advertisement. A user of client device 103(*a*) who views a user-generated advertisement may interact with interactive content using remote control 105 or other input device. In at least one embodiment, interactive content may initiate a communication from a user of the client device 103(*a*) to a second user or entity associated with the user-generated advertisement, for example, the person or business who posted the ad. For example, a first user may be able to click on or select an interactive portion of a user-generated advertisement being displayed on presentation device 104, wherein the client device 103(*a*) would initiate a phone call from the first user to the second user. In such an embodiment, client device 103(*a*) may be equipped with telephonic capabilities, for example, if client device 103(*a*) is a smart phone or other cellular-enabled device, or may be communicatively coupled to a user's cellular device via Bluetooth or other wireless or wired connection. In other embodiments, in response to user interaction with the interactive portion of the user-generated advertisement, the client device may initiate an electronic message such as an email or SMS to the second user. In some embodiments, interactive content may provide other functionality, for example, providing a more detailed view or additional information regarding the user-generated advertisement.

In at least one embodiment, uploaded user-generated advertisements may optionally go through an approval or screening process before being communicated to the video content source 101. Such an approval or screening process would be performed either by a moderator or automatically through an automated content-screening process. Such a moderator or automated process might search for certain words in an uploaded ad that indicate that the ad does not meet specified content criteria, may use a blacklist of prohibited users, or may otherwise analyze the source, content and/or structure of an ad to see if it is problematic. An approval or screening process may be useful to avoid misuse of the system and/or to avoid transmission of fraudulent, offensive, improperly formatted, or low quality advertising material to the public.

In several embodiments, user-generated advertisements are associated with one or more categories. In some embodiments, a user who uploads the advertisement selects a category for the ad at upload time. In other embodiments, the user-generated advertisement server 201 automatically categorizes the advertisement through an automated categorization process. An automated process may, for example, be based on an analysis of words contained in the ad. For example, an uploaded ad that contains the words "Ford," "V6" and/or "manual transmission" could be automatically categorized in an automobile category, whereas an ad containing the word "couch" would be categorized as furniture. Some implementations may attempt to categorize automatically, and then confirm a selected category with the user.

In at least one embodiment, user-generated advertisements are also associated with one or more geographical identifiers which identify a geographical region or area where the advertisements are relevant or targeted. Geographical identifiers may be selected by an uploading user or, in other embodiments, may be automatically selected based on a location of the user or client device, which is known by the video content source 101, user-generated advertisement server 202, or other server.

In some embodiments, the user-generated advertisement server 201 transmits the user-generated advertisement to the video content source 101. The video content source 101 then transmits the user-generated advertisement to the client device 103(a) through the distribution network 102. The user-generated advertisement is associated with a selected channel based on an advertising category associated with the advertisement. In some embodiments, a user-generated advertisement is associated with a selected channel based at least in part on a geographical identifier associated with the user-generated advertisement. In some embodiments, association with a channel is performed by the video content source 101 or the user-generated advertisement server 201. In others, the client device 103(a) may associate user-generated advertisements with a virtual channel, generated at the client device 103(a). User-generated advertisements may have multiple categories and in such cases may pertain to multiple channels.

In some embodiments, the video content source 101 transmits the user-generated advertisement to a client device 103(a) that is located in the geographical region(s) corresponding to the one or more geographical identifiers associated with the advertisement. In other embodiments, user-generated advertisements are broadcasted to multiple client devices across different geographical regions, but the client device 103(a) filters the received user-generated advertisements in order to limit viewing of user-generated advertisements to those with geographical identifiers corresponding to the geographical region where the client device 103(a) is located.

As discussed above, video content channels and user-generated advertising channels may be either linear or nonlinear. In at least one embodiment, user-generated advertisements are transmitted as a plurality of linear channels. In such an embodiment, user-generated advertising channels comprise a plurality of contiguous streams of video data. Each stream of video data may provide an iterative (i.e., rotating) view of presently-available user-generated advertisements in the category corresponding to the channel. In one example of such an embodiment, video content source 101 would stream multiple channels, corresponding to multiple categories, of user-generated advertisements to client devices. As an illustration of this example, the video content source 101 could transmit a "furniture" user-generated advertising channel which comprises a video stream that presents an iterative view of current user-generated advertisements for furniture in the geographical region where the client device 103(a) that receives the channels is located. When user-generated advertising is distributed in this manner as a linear channel, client device 103(a) may view or optionally record (via DVR) the user-generated advertisement channels synchronously, i.e., as they are being transmitted. The view of user-generated advertisements that is being continuously and iteratively streamed by video content source 101 may change as advertisements are added, modified, or deleted at the user-generated advertisement server 201. In some embodiments, the client device may be optionally configured to record (as in a DVR) one or more user-generated advertisement channels so that a user can review the advertisements at a later time.

In at least one embodiment, user-generated advertising channels comprise a plurality of nonlinear channels. In such an embodiment, the user-generated advertisements may be viewed asynchronously at the client device 131. For example, each user-generated advertisement may be transmitted individually to client device 103(a), which utilizes category data transmitted with each advertisement to generate a nonlinear virtual channel that aggregates and displays all advertisements in a given category that are directed to the geographical region of the client device. In an optional extension of such an embodiment, virtual channels may be customized based on advertisement filtering criteria provided by the user. For example, a user may set up a virtual channel that displays all ads with the word "couch" in them and limit the channel to items located within 50 miles of the user. This type of filtering may utilize metadata transmitted with the ads to facilitate the filtering.

In another embodiment employing nonlinear user-generated advertising channels, video content source 101 may transmit a video stream, comprising the user-generated advertisements in a given category, to the client device 103(a) for local storage thereon. In this embodiment, when a user selects a channel identifier associated with the channel corresponding to the category, the stored video stream is displayed. This stored video stream may be updated or replaced by the video content source 101 when user-generated advertisements are modified, added, or deleted from the category at the user-generated advertisement server 201. Each of these embodiments may take into account a target geographical region associated with the user-generated advertisement, as discussed throughout this application.

Figure 3:
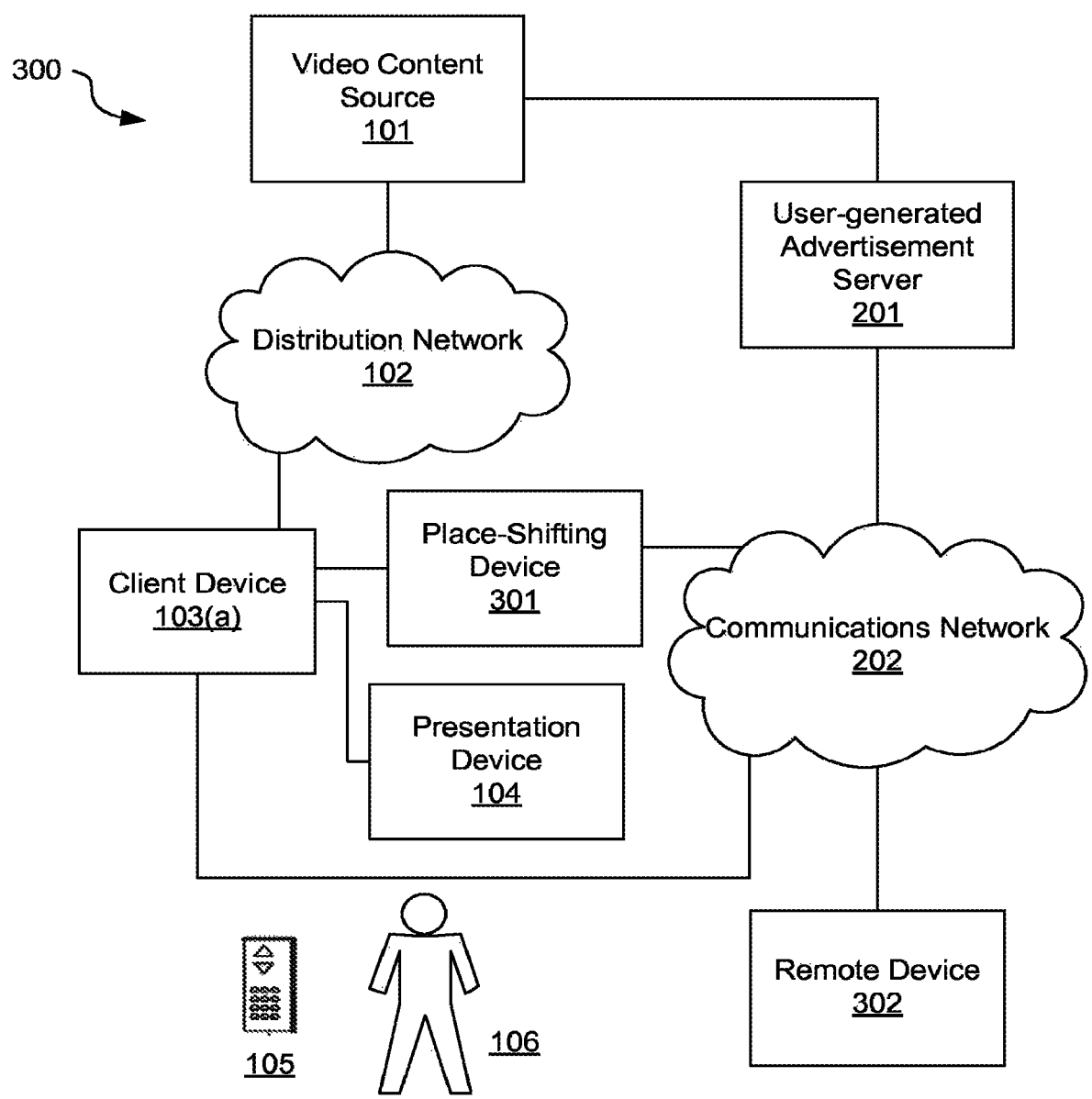
FIG. 3 illustrates an embodiment of a video content distribution environment that includes place-shifting.

A third content distribution environment 300, which includes place-shifting, is depicted in FIG. 3. The content distribution environment 300 comprises a video content source 101, distribution network 102, client device 103(a), presentation device 104, remote control 105, user-generated advertisement server 201, and communications network 202—all of which may have similar attributes or configurations as corresponding elements discussed herein with respect to FIG. 1 and/or FIG. 2. Content distribution environment 300 additionally includes a place-shifting device 301 and a remote device 302. Additional elements, such as a second client device 103(b) depicted in FIG. 1, may also be included in embodiments of the content distribution environment 300, but are not depicted in FIG. 3 for the sake of brevity.

A place-shifting device 301 is an apparatus that transmits, re-transmits, or relays video content from client device 103(*a*) to a remote device 302 through communications network 202. In some embodiments, place-shifting device 301 may be integrated with client device 103(*a*) as one device; in others, it may be communicatively coupled to the client device 103(*a*). As one example of place-shifting functionality, the place-shifting device 301 may transmit from the client device 103(*a*), through the communications network 202 to the remote device 302, in real-time or near real-time, one or more streams of video content that are being received from the video content source 101 at the client device 103(*a*). To elaborate, content is first received at the client device 103(*a*) from the video content source 101 through the distribution network 102 and decoded or partially decoded at the client device 103(*a*). It is then transmitted from the client device 103(*a*) to the place-shifting device 301 in either an encoded or decoded format. In some embodiments, the place-shifting device 301 may encode and/or repackage the stream in a format that is suitable for transmission across the communications network 202. The place-shifting device 301 may also utilize security features, such as various known encryption techniques, when encoding the video stream in order to prevent interception or unauthorized viewing of the video content. Commercial examples of place-shifting devices include some of the SLINGBOX line of products that are produced and marketed by Sling Media, Inc. of Foster City, Calif.

In some embodiments, the place-shifting device 301 may also place-shift (i.e., stream) content that is available at the client device 103(*a*) other than video content that is being concurrently received from the video content source 101. For example, the place-shifting device 301 may stream content that is recorded on a DVR of the client device 103(*a*) to the remote device 302. In other embodiments, other graphical content that is available on the client device 103(*a*)—for example, applications, interactive menus, games, photographs, and the like—may also be place-shifted to the remote device 302 by the place-shifting device 301.

In some embodiments, the place-shifting device 301 has the ability to transmit control commands, received from a user of the remote device 302 through the communications network 201, to the client device 103(*a*) in order to provide the remote user with interaction with the client device 103(*a*). For example, a remote user may instruct the place-shifting device 301, through the communications network 202, to command the client device 103(*a*) to select particular video content and begin place-shifting the content to the remote device 302. As further examples, commands may be sent to set recording timers on the client device 103(*a*) or to adjust settings on the client device 103(*a*) such as parental controls. Such commands may be submitted from the place-shifting device to the client device via a wired or wireless optical connection (e.g., IR), via radio frequency, via a wired or wireless network communications interface, or via commands sent through a connecting cable, for example, through a USB connection or a CEC (consumer electronics control) bus of an HDMI® connection.

The place-shifting device may transmit one or more linear or nonlinear channels of programming content from the client device 103(*a*) to the remote device 103(*a*). However user-generated advertisement channels may be treated differently than programming content channels with respect to place-shifting. In such embodiments, the client device 103(*a*) receives a first set of user-generated advertisements from the video content source 101. These user-generated advertisements may have one or more geographic identifiers that identify them as being associated with the specific geographical region where the client device 103(*a*) is located. The remote device 302 receives a second set of user-generated advertisements—which may be different than the user-generated advertisements received at the client device 103(*a*)—that have a geographical identifier that identifies them as being associated with the geographical region where the remote device 302 is located at a given point in time, which may be geographically separate from the client device 103(*a*). In other words, the user-generated advertisements received by the remote device 302 may be specific to the geographical region where the user of the remote device 302 is currently located even though programming content is place-shifted from the client device 103(*a*), which resides in a different geographical region. In some embodiments, the second set of user-generated advertisements may be sent to the remote device 302 through the communications network 202 from any of the user-generated advertisement server 201, video content source 101, or other server configured to provide user-generated advertisements. In other embodiments, user-generated advertisements may be transmitted from the client device 103(*a*). The user-generated advertisements may be provided on the remote device 302 as a linear or nonlinear channel of video content, as discussed elsewhere herein.

As an illustration, a user may have a client device 103(*a*) in their home in New York City that receives national and local programming content and user-generated advertisements that are specific to the New York City region. The user may travel to Los Angeles with their remote device 302 (e.g., a smart-phone, laptop, tablet PC, or other portable electronic device.). The place-shifting device 301 may transmit programming content from the client device 103(*a*) to the remote device 302 so the user may view his subscribed-to programming content while away from home. However, the remote device 302 may receive and present user-generated advertisements, through the communications network 202, that are specific to the Los Angeles geographical region.

Figure 4:
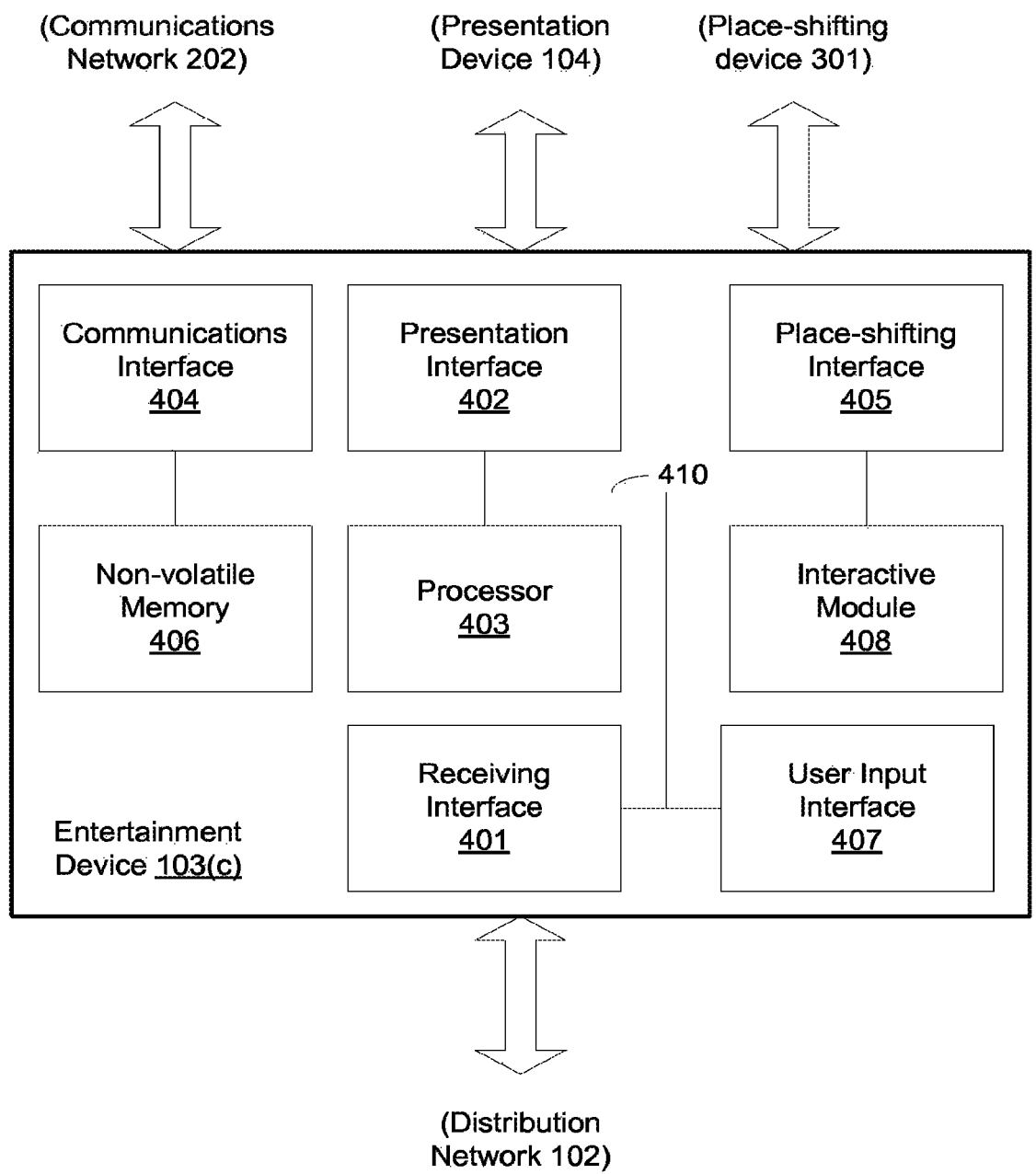
FIG. 4 illustrates an embodiment of an entertainment device.

FIG. 4 depicts an entertainment device 103(*c*), which may be an embodiment of client devices 103(*a*) or 103(*b*) depicted in FIGS. 1, 2 and/or 3. Various devices, networks and systems to which entertainment device 103(*c*) connects or interfaces are depicted in parentheses in FIG. 4 for reference, for example, distribution network 102, communications network 202, presentation device 104, and, optionally, place-shifting device 301. In some embodiments, communications interface 404 and receiving interface 401 may be integrated as a single interface, and in such embodiments, communications network 202 and distribution network 201 may be the same network.

Entertainment device 103(*c*) includes a bus 410, which connects each of the numbered components with one or more of the other components. The bus 410 and the connections thereto that are depicted in FIG. 4 are merely illustrative; the components of the entertainment device 103(*c*) may be connected in any of several configurations using any number of busses or other connections. Further, FIG. 4 is merely an illustration of an embodiment of an entertainment device 103(*c*), and it is understood that the components thereof may be implemented either functionally or logically, as hardware or as software, and may be integrated into consolidated units or separated into multiple units beyond what is depicted in the example embodiment shown in FIG. 4.

Entertainment device 103(c) comprises a communications interface 404 that communicates with the communications network 202; a presentation interface 402 that outputs video content, including user-generated advertising content, for display at a corresponding presentation device 104; non-volatile memory 406 for storage of data, including, for example, DVR storage and application code; and an optional place-shifting interface 405 which communicates with a place-shifting device 301. In some embodiments, presentation device 104 and/or place-shifting device 103(a) may be integrated with entertainment device 103(c) as one apparatus.

Entertainment device 103(c) also comprises a receiving interface 401, which receives video content and user-generated advertisements from the video content source 101 through the distribution network 102. Received user-generated advertisements may correspond to one or more categories and in some embodiments may have geographical identifiers corresponding to the geographical region where the entertainment device 103(c) is located, as discussed in embodiments elsewhere herein.

A user input interface 407 of the entertainment device 103(c) receives commands from a user, for example through a remote control, including a user selection of a channel. In some embodiments, user input interface 407 may be configured to receive input from a user to provide interaction with interactive content that may be embedded in user-generated advertisements.

The entertainment device 103(c) also includes a processor 403. The processor 403 and/or the receiving interface 401 identify a plurality of channels of video programming content and a plurality of channels of user-generated advertisements. Channels of user-generated advertisements may correspond to categories of user-generated advertisements. In some embodiments, some of the channels may present video streams of user-generated advertisements that correspond to a geographical identifier that is associated with the geographical region of the entertainment device 103(c).

As discussed elsewhere herein, user-generated advertisement channels may be linear, wherein a video stream may be displayed synchronously as it is received through receiving interface 401 from video content source 101. In some embodiments, linear channels may also be recorded into non-volatile memory 406 for subsequent viewing. Alternatively, as discussed elsewhere herein, channels may be nonlinear. In such embodiments, user-generated advertisements may be received at receiving interface 401 and stored in non-volatile memory 406 by a storage module (not shown) for subsequent asynchronous viewing. Received user-generated advertisements may comprise video data and/or non-video data representing the user-generated advertisements. In some embodiments, video streams comprising the nonlinear channels of user-generated advertisements are received from the video content source 101. In others, the processor 403 may generate nonlinear virtual user-generated advertisement channels corresponding to categories of the user-generated advertisements, which present received user-generated advertisements by category, and provide channel identifiers that correspond to the generated virtual channels. When a user selects or inputs a channel identifier corresponding to a linear or nonlinear user-generated advertising channel, the channel is presented to the user for viewing.

Some embodiments of entertainment device 103(c) may additionally include an optional interactive module 408, coupled to the user input interface 407, which facilitates interactivity with respect to user-generated advertisements. Interactivity may include searching, sorting, filtering, setting alerts, or interacting with embedded interactive content, as discussed elsewhere herein. The interactive module 408 may facilitate interactive functionalities by processing metadata or embedded interactive data that is included in user-generated advertisements. Interactive functionality may be compatible with embodiments that involve linear channels or with those that involve nonlinear channels.

Figure 5:
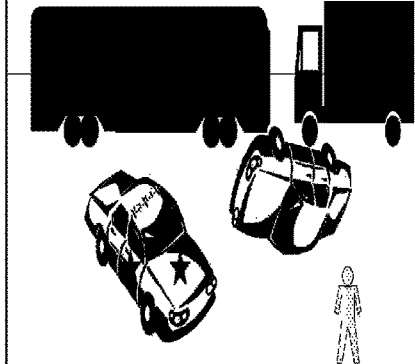
FIG. 5 illustrates an example screen shot of an embodiment of an electronic programming guide.

FIG. 5 depicts an example screen shot of an electronic program guide ("EPG") graphical user interface 500. The EPG graphical user interface 500 may be generated at the entertainment device 103(c) for display on a presentation device 104. Electronic program guide data may be received from video content source 101 through distribution network 102 or from a separate source through the communications network 202. Information about programming channels (e.g., Newz 99 & Sportz 121) and user-generated advertising channels ("Local Ads: Furniture 198" & "Local Ads: Autos 199") are both presented in the EPG graphical user interface 500 and are selectable by a user of the entertainment device 103(c). In this example, a user could select channel 99 and be able to view the "News Hour" programming content, or could select channel 198 to view local user-generated advertisements in the furniture category. In one embodiment, if a user selects a user-generated advertising channel (198 or 199), the entertainment device 103(c) outputs an iteration of presently available user-generated advertisements in a category corresponding to the channel for display on presentation device 104. Additionally, in some embodiments, a user 106 may, through a remote control 105, record a user-generated advertisement channel and then view the content of the channel at a later date. In some embodiments, user-generated advertisements displayed in local ad channels 198 or 199 could optionally be searchable, filterable or sort-able, or alerts could be set on particular keywords, price ranges, categories of ads, or on other criteria. In such embodiments, an additional graphical user interface, not shown, may provide interface elements to facilitate such searching, filtering, sorting, or alerts functionality.

Figure 6:
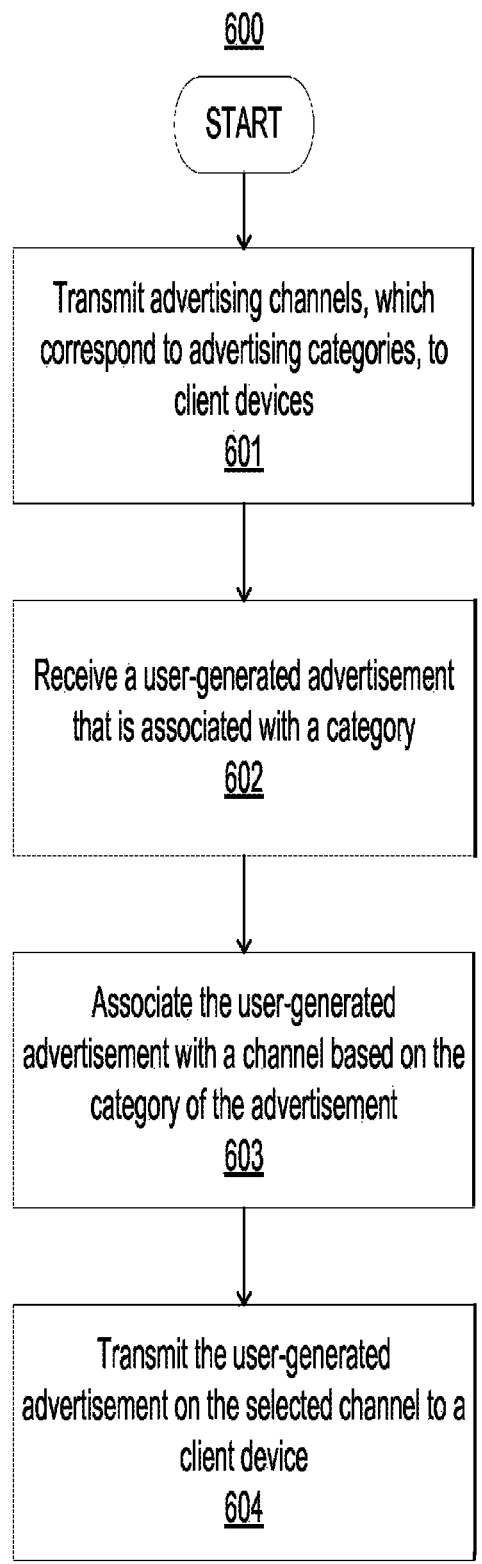
FIG. 6 illustrates an embodiment of a process for providing user-generated advertisements in a video content distribution network.

FIG. 6 depicts an embodiment of a process 600 for providing user-generated advertising content to a user through a video content distribution network. The process 600 includes transmitting advertising channels, which correspond to advertising categories, to client devices (operation 601). There may be multiple advertising channels corresponding to multiple advertising categories. The process 600 further includes receiving a user-generated advertisement that is associated with a category (operation 602). User-generated advertisements may be received from a client device of the video content distribution network or from a separate upload device. A graphical user interface may be provided at the client device or upload device to assemble and/or upload the user-generated advertisement. An advertisement may be associated with a category by the uploading user, or categorization may be done through an automatic process.

The process 600 further includes transmitting the user-generated advertisement on the selected channel to a client device (operation 604). User-generated advertisement channels may be selected by a user of the client device for viewing by selecting or inputting a corresponding channel identifier assigned to the channel. In various embodiments, the user-generated channel may be transmitted to the client device as a linear channel, which may either be viewed synchronously at the client device or optionally recorded on a DVR, or as a nonlinear channel that may be stored at the client device and viewed asynchronously. Alternatively, user-generated advertisements may be sent individually to client device and assembled into a virtual channel, based on category, at the client device.

Figure 7:
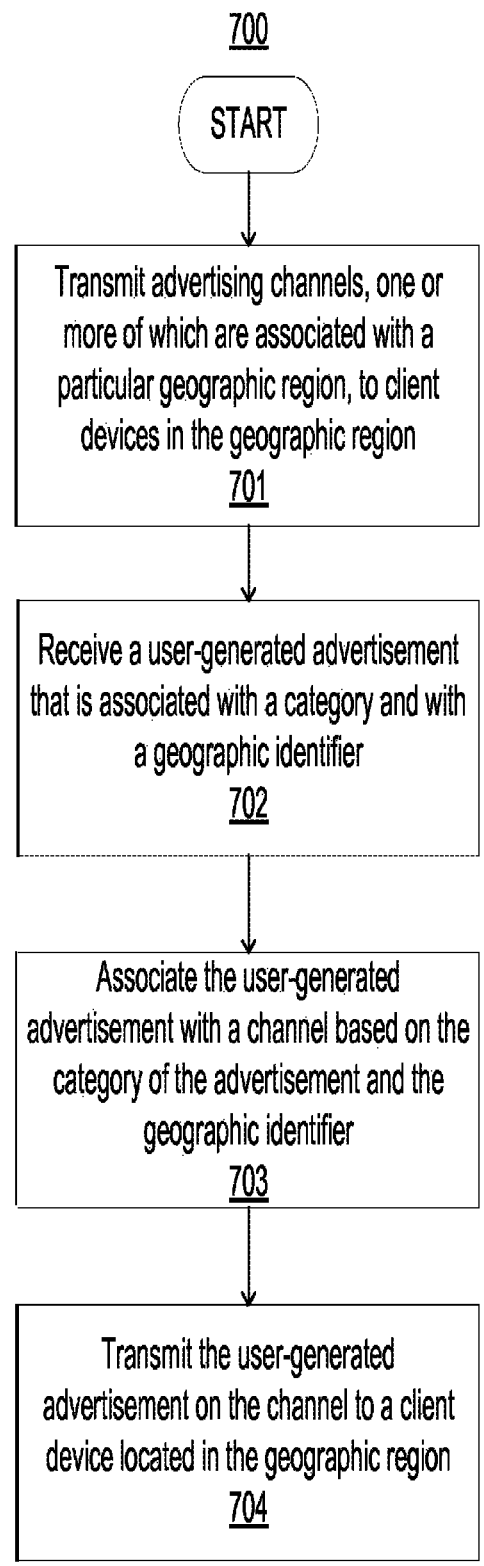
FIG. 7 illustrates an embodiment of a process for providing local user-generated advertisements in a video content distribution network.

FIG. 7 depicts an embodiment of a process 700 for providing local user-generated advertising content to a user through a video content distribution network. The process 700 includes transmitting advertising channels, which correspond to categories of user-generated advertisements, some of which are associated with a particular geographical region, to client devices in the geographical region (operation 701). User-generated advertisements may be distributed as linear or nonlinear channels, as described in further detail elsewhere herein. The process 700 further includes receiving a user-generated advertisement that is associated with a category and with a geographical identifier (operation 702). The geographical identifier may correspond to the geographical region, for example, a postal code, telephonic area code, city name, county name, or other geographically identifying data.

The process 700 further includes associating the user-generated advertisement with a channel based on the category of the advertisement and the geographical identifier (operation 703). The process 700 also includes transmitting the user-generated advertisement, on the channel, to a client device located in the geographical region (operation 704). The content of a user-generated advertisement channel of the entertainment device may be generated at a video content source in some embodiments or at the client device in others.

Figure 8:
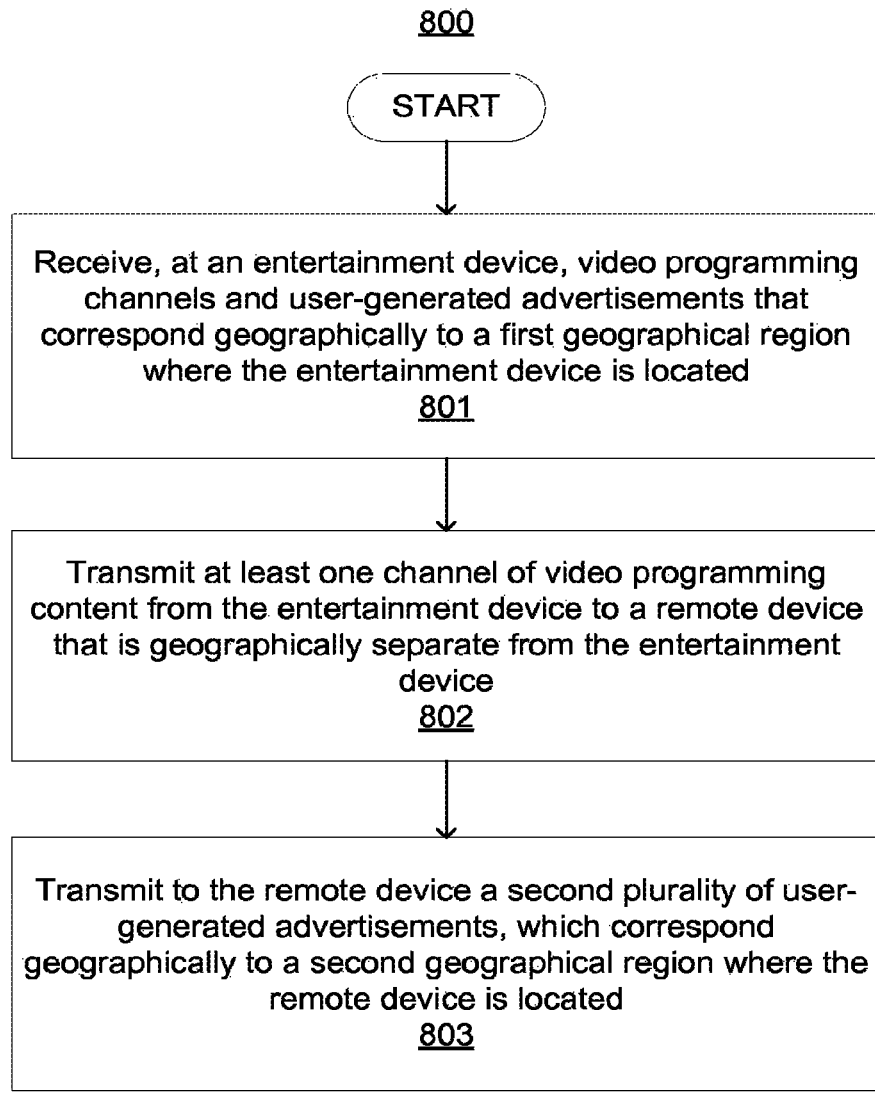
FIG. 8 illustrates an embodiment of a process for providing user-generated advertisements in a video content distribution network that includes place-shifting.

FIG. 8 depicts an embodiment of a process 800 for providing location-specific user-generated advertisements in a video content distribution network that includes place-shifting. The process 800 includes receiving, at an entertainment device, video programming channels (which may be regional, national or international in scope) and user-generated advertisements that correspond geographically to the geographical region where the entertainment device is located (operation 801). In some embodiments, the user-generated advertisements may be associated with a geographical identifier that corresponds to the geographical region. In at least one embodiment, the user-generated advertisements may be displayed in at least one channel, linear or nonlinear, of user-generated advertisements. Channels may correspond to categories of user-generated advertisements.

The process 800 also includes transmitting at least one channel of video programming content from the entertainment device to a remote device, which is geographically separate from the entertainment device (operation 802). In some embodiments, the video programming content may be place-shifted by a place-shifting device. The process 800 may also comprise transmitting to the remote device a second plurality of user-generated advertisements, which correspond geographically to the geographical region where the remote device is located (operation 803). The ads may be associated with a geographical identifier that corresponds to the geographical region. In at least one embodiment, the user-generated advertisements may be displayed at the remote device in at least one channel, linear or nonlinear, of user-generated advertisements. The second plurality of user-generated advertisements may, in some embodiments, be transmitted to the remote device from a video content source or a user-generated advertisements server, or in others, from the client device.

Although specific embodiments were described herein, the scope of the invention is not limited to those specific embodiments. The scope of the invention is defined by the following claims and any equivalents therein.

What is claimed is:

1. A method comprising:
generating a user interface to facilitate advertisement generation with an entertainment device, the user interface comprising one or more selectable interface elements to select one or more geographical regions, where the entertainment device is a client device;
generating an advertisement based at least in part on one or more selections made via the user interface to create a generated advertisement targeted to a second geographical region;
receiving, at the entertainment device, a plurality of channels of video programming content and a first set of one or more user-generated advertisements;
automatically filtering, by the entertainment device without user input, the first set of one or more user-generated advertisements to identify a filtered set of one or more user-generated advertisements comprising a second set of one or more user-generated advertisements corresponding geographically to a first geographical region where a remote device that is geographically separate from the entertainment device is located; and
consequent to the filtering, transmitting, from the entertainment device to the remote device that is geographically separate from the entertainment device, video programming content of at least one channel of the plurality of channels of video programming content and the filtered set of one or more user-generated advertisements.

2. The method as claimed in claim 1, wherein the entertainment device transmits the second set of one or more user-generated advertisements to the remote device.

3. The method as claimed in claim 1, wherein the second set of one or more user-generated advertisements is transmitted to the remote device from one or both of a video content source and a user-generated advertisement server.

4. The method as claimed in claim 3, further comprising:
receiving a first plurality of user-generated advertisement channels at the entertainment device; and
transmitting a second plurality of user-generated advertisement channels to the remote device.

5. The method as claimed in claim 1, further comprising:
receiving a plurality of user-generated advertisements in one or more broadcasted channels, the plurality of user-generated advertisements comprising the first set of one or more user-generated advertisements with one or more additional user-generated advertisements.

6. The method as claimed in claim 5, wherein the one or more broadcasted channels correspond to one or more advertising channels broadcast as linear broadcast channels, wherein a linear broadcast channel is broadcast, synchronous video as opposed to non-linear, on-demand video.

7. The method as claimed in claim 6, further comprising:
upon receipt of at least part of the one or more broadcasted channels, automatically filtering without user input at least part of the plurality of user-generated advertisements to display only included advertisements corresponding to the first geographical region.

8. The method as claimed in claim 1, further comprising:
generating a user interface to facilitate advertisement generation with the entertainment device;
generating an advertisement based at least in part on one or more selections made via the user interface to create a generated advertisement; and
transmitting the generated advertisement with the second set of one or more user-generated advertisements.

9. The method as claimed in claim 8, further comprising:
associating the generated advertisement with a geographical identifier corresponding to the first geographical region automatically identified as corresponding to the entertainment device.

10. The method as claimed in claim 9, further comprising:
associating the generated advertisement with at least one advertising category of a plurality of advertising categories based on an automated categorization processes without user input.

11. An entertainment device comprising:
one or more network interfaces to access a network and one or more processing devices coupled to the one or more network interfaces and to one or more one or more non-transitory, storage media storing instructions, the one or more processing devices to execute the instructions to perform:
generating a user interface to facilitate advertisement generation, the user interface comprising one or more selectable interface elements to select one or more geographical regions, where the entertainment device is a client device;
generating an advertisement based at least in part on one or more selections made via the user interface to create a generated advertisement targeted to a second geographical region;
processing a plurality of channels of video programming content received at the entertainment device and a first set of one or more user-generated advertisements received at the entertainment device;
automatically filtering, by the entertainment device without user input, the first set of one or more user-generated advertisements to identify a filtered set of one or more user-generated advertisements comprising a second set of one or more user-generated advertisements corresponding geographically to a first geographical region where a remote device that is geographically separate from the entertainment device is located; and
consequent to the filtering, causing transmitting, from the entertainment device to the remote device that is geographically separate from the entertainment device, video programming content of at least one channel of the plurality of channels of video programming content and the filtered set of one or more user-generated advertisements.

12. The entertainment device as claimed in claim 11, wherein the entertainment device transmits the second set of one or more user-generated advertisements to the remote device.

13. The entertainment device as claimed in claim 11, wherein the second set of one or more user-generated advertisements is transmitted to the remote device from one or both of a video content source and a user-generated advertisement server.

14. The entertainment device as claimed in claim 13, the one or more processing devices to further perform:
processing a first plurality of user-generated advertisement channels received by the entertainment device; and
cause transmitting a second plurality of user-generated advertisement channels to the remote device.

15. The entertainment device as claimed in claim 11, the one or more processing devices to further perform:
processing a plurality of user-generated advertisements in one or more broadcasted channels received by the entertainment device, the plurality of user-generated advertisements comprising the first set of one or more user-generated advertisements with one or more additional user-generated advertisements.

16. One or more non-transitory, machine-readable media comprising processor-readable instructions which, when executed by one or more processing devices, cause the one or more processing devices to perform:
generating a user interface to facilitate advertisement generation with an entertainment device, the user interface comprising one or more selectable interface elements to select one or more geographical regions, where the entertainment device is a client device;
generating an advertisement based at least in part on one or more selections made via the user interface to create a generated advertisement targeted to a second geographical region;
processing a plurality of channels of video programming content and a first set of one or more user-generated advertisements received by the one or more processing devices;
automatically filtering, by the entertainment device without user input, the first set of one or more user-generated advertisements to identify a filtered set of one or more user-generated advertisements comprising a second set of one or more user-generated advertisements corresponding geographically to a first geographical region where a remote device that is geographically separate from the one or more processing devices is located; and
consequent to the filtering, causing transmitting, to the remote device that is geographically separate from the one or more processing devices, video programming content of at least one channel of the plurality of channels of video programming content and the filtered set of one or more user-generated advertisements.

17. The one or more non-transitory, machine-readable media as claimed in claim 16, the one or more processing devices to further perform:
processing a first plurality of user-generated advertisement channels received by the entertainment device; and
cause transmitting a second plurality of user-generated advertisement channels to the remote device.

18. The one or more non-transitory, machine-readable media as claimed in claim 16, the one or more processing devices to further perform:
processing a plurality of user-generated advertisements in one or more broadcasted channels received by the entertainment device, the plurality of user-generated advertisements comprising the first set of one or more user-generated advertisements with one or more additional user-generated advertisements.

19. The one or more non-transitory, machine-readable media as claimed in claim 16, the one or more processing devices to further perform:
processing a plurality of user-generated advertisements received in one or more broadcasted channels, the plurality of user-generated advertisements comprising the first set of one or more user-generated advertisements with one or more additional user-generated advertisements, wherein the one or more broadcasted channels correspond to one or more advertising channels broadcast as linear broadcast channels, wherein a linear broadcast channel is broadcast, synchronous video as opposed to non-linear, on-demand video; and upon receipt of at least part of the one or more broadcasted channels, automatically filtering without user input at least part of the plurality of user-generated advertisements to display only included advertisements corresponding to the first geographical region.

20. The one or more non-transitory, machine-readable media as claimed in claim 16, the one or more processing devices to further perform:

generating a user interface to facilitate advertisement generation;

generating an advertisement based at least in part on one or more selections made via the user interface to create a generated advertisement; and causing transmitting the generated advertisement with the second set of one or more user-generated advertisements.

* * * * *